March 4, 1958 F. J. KURTH ET AL 2,825,274
AIR OUTLET DEVICE FOR VENTILATING APPARATUS
Filed Aug. 20, 1953 3 Sheets-Sheet 1

INVENTORS
Franz J. Kurth,
Friedrich Honerkamp,
Leonard R. Phillips,
BY Carroll Bailey
ATTORNEY

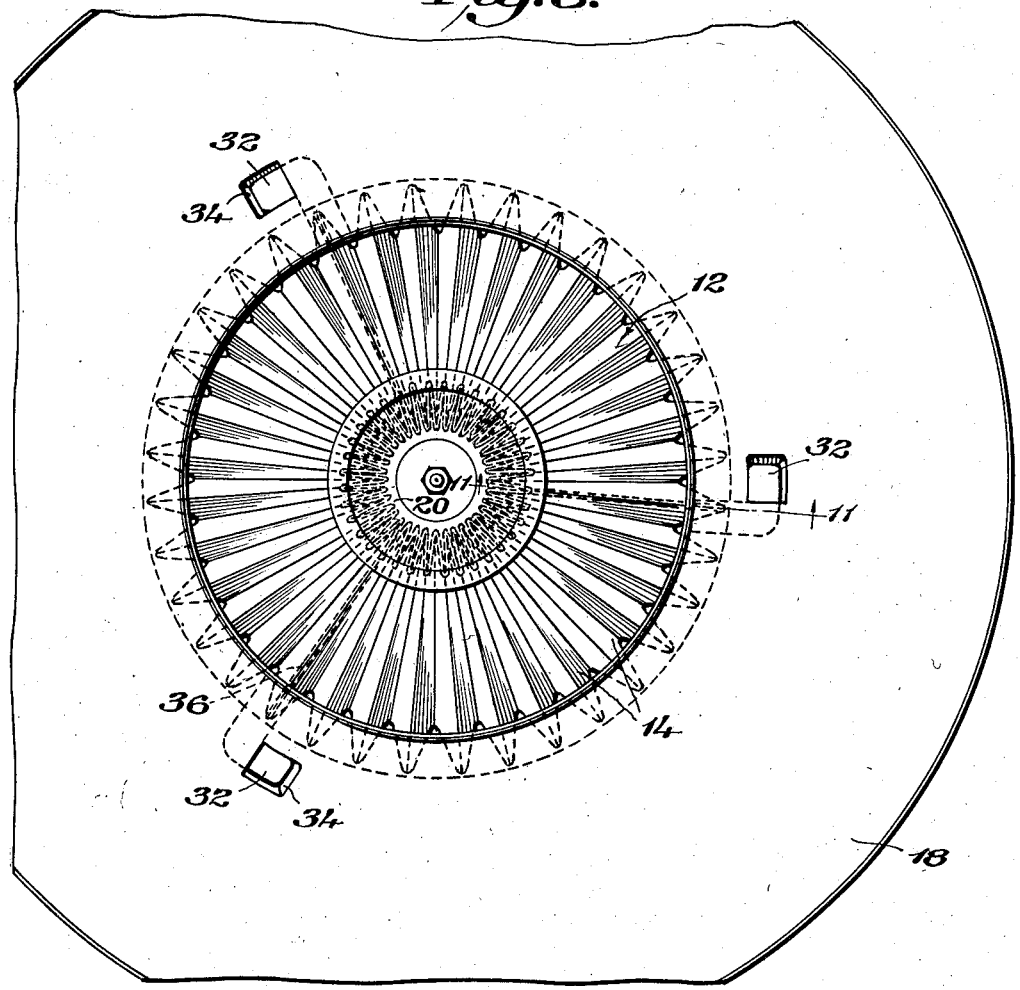
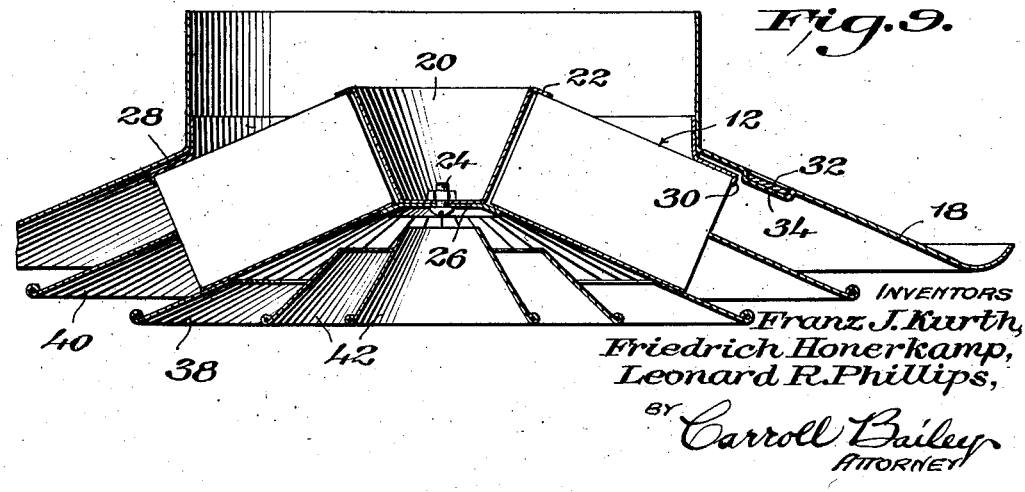

March 4, 1958 F. J. KURTH ET AL 2,825,274
AIR OUTLET DEVICE FOR VENTILATING APPARATUS
Filed Aug. 20, 1953 3 Sheets-Sheet 3

INVENTORS
Franz J. Kurth,
Friedrich Honerkamp,
Leonard R. Phillips,
BY Carroll Bailey
ATTORNEY United States Patent Office 2,825,274
Patented Mar. 4, 1958

2,825,274

AIR OUTLET DEVICE FOR VENTILATING APPARATUS

Franz J. Kurth, Mamaroneck, N. Y., and Friedrich Honerkamp, West Hartford, and Leonard R. Phillips, East Hartford, Conn., assignors to Anemostat Corporation of America, New York, N. Y., a corporation of Delaware Application August 20, 1953, Serial No. 375,378

4 Claims. (Cl. 98—38)

This invention relates to ventilating apparatus, and has particular reference to improvements in air outlet devices through which supply air for heating, cooling, ventilating or other purposes, is delivered into rooms or other enclosures.

In delivering supply air into an enclosure it usually is desirable to effect early mixing with the supply air of a considerable proportionate amount of the enclosure air in order early to compensate for any temperature differential between the supply air and the enclosure air and thus avoid occupants of the enclosure experiencing any sensation of draft due to difference in temperature between the supply air and the enclosure air.

Accordingly, the primary object of the present invention is to provide an air outlet device embodying simple, practical means whereby any given amount of supply air delivered through the device into an enclosure effects quick and effective mixing therewith of an exceptionally large proportionate amount of the enclosure air.

With the foregoing and other objects in view, as will become more fully apparent as the nature of the invention is better understood, the same consists of an air outlet device embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 8 is a top plan view illustrating another alternative form of air outlet device constructed in accordance with the invention.

Fig. 9 is a central, longitudinal section through the device illustrtaed in Fig. 8.

Figure 1:
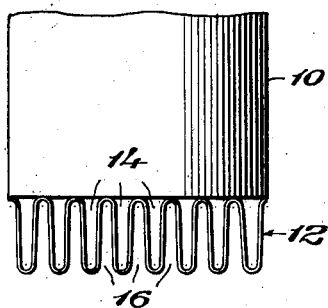
Fig. 1 is a side elevation of an air outlet device constructed in accordance with the invention.

Referring to the drawings in detail, it will be observed that ventilating apparatus, in accordance with each of the different illustrated forms of the invention, includes suitable means, such as a duct 10, for delivering supply air for heating, cooling, ventilating or other purposes, into a room or other enclosure, and an element 12 disposed transversely across the path of flow of the supply air from said duct so as to intercept the supply air and to deflect it laterally outward. It will further be observed that the element 12 is provided with rearwardly opening supply air receiving channels 14 which are spaced apart laterally relative to each other to divide the supply air into separate laterally spaced apart streams. In flowing into the enclosure these streams have the effect of dragging along and entraining enclosure air from the spaces between them and thereby tending to create in said spaces sub-normal pressures. As a result, there occurs a constant replacement flow of enclosure air into the spaces between the supply air streams and a constant entrainment of enclosure air by the supply air streams. As the supply air streams flow into the enclosure they expand and diffuse and create more or less turbulence with the result that there occurs a more or less thorough mixing of the entrained enclosure air with the supply air in the immediate vicinity of the apparatus. Hence, there is a rapid compensation for any temperature differential between the supply air and the enclosure air so that persons occupying the enclosure experience little or no sensation of draft even though there may be a considerable difference in temperature between the supply air and the enclosure air.

Figure 2:
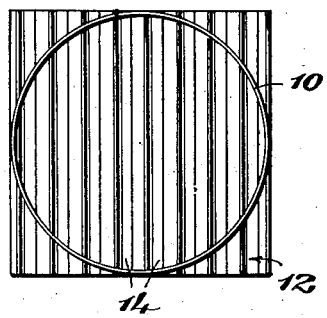
Fig. 2 is a top plan view of the device illustrated in Fig. 1.
Figure 3:
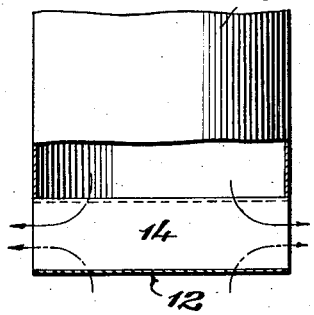
Fig. 3 is a longitudinal section through the device illustrated in Figs. 1 and 2.
Figure 4:
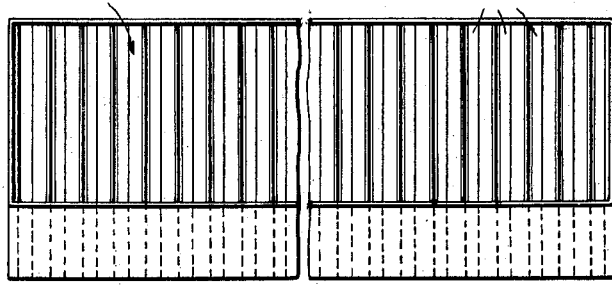
Fig. 4 is a top plan view of an alternative form of air outlet device constructed in accordance with the invention.
Figure 5:
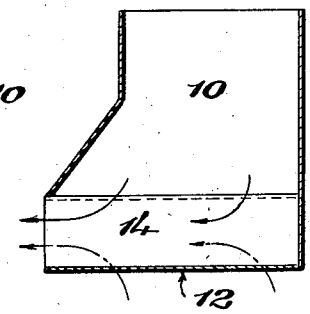
Fig. 5 is a transverse section through the device illustrated in Fig. 4.

As illustrated in Figs. 1 to 3 of the drawings, the channels 14 may be disposed parallel, or substantially parallel, to each other and may be open at both ends, in which event supply air streams will flow in opposite directions laterally from the element 12. On the other hand, as illustrated in Figs. 4 and 5 of the drawings, the channels 14 may each be closed at one end and open only at the other end so that the supply air streams will flow only in one direction laterally from the element 12. In either case, the supply air duct 10 may be of circular shape in cross section, as illustrated in Figs. 1 to 3 of the drawings, or of rectangular shape in cross section, as illustrated in Figs. 4 and 5 of the drawings. In fact, in either case, the supply air duct may be of any suitable shape in cross section.

Should the supply air duct 10 be of rectangular shape in cross section, it may be either square or elongated cross sectionally, and if it should be elongated cross sectionally, it may be of any desired cross sectional width and length. If the duct 10 is elongated cross sectionally, the channels 14 preferably will extend transversely relative to the longer cross sectional dimension of said duct, as illustrated in Figs. 4 and 5 of the drawings, to insure division of the supply air into a maximum number of streams of any given widths.

Figure 6:
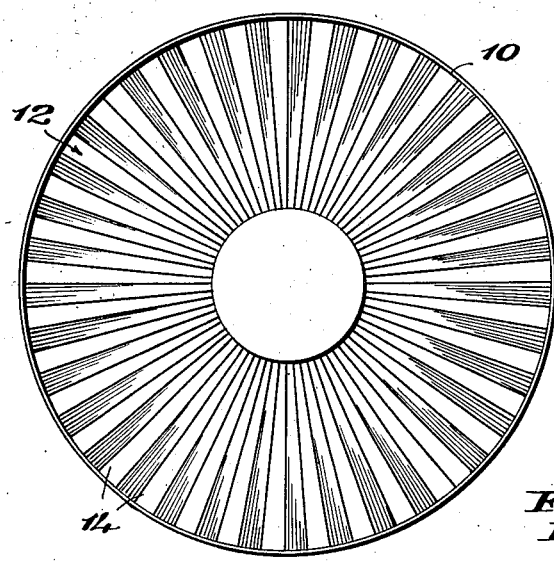
Fig. 6 is a top plan view of another alternative form of air outlet device constructed in accordance with the invention.
Figure 7:
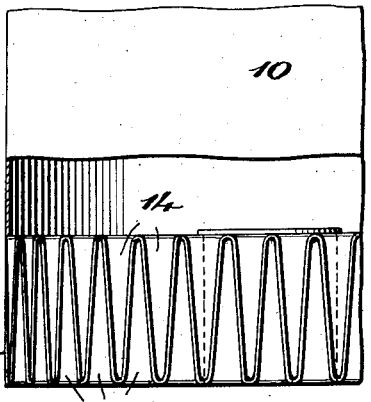
Fig. 7 is a fragmentary side elevation of the device illustrated in Fig. 6.
Figure 10:
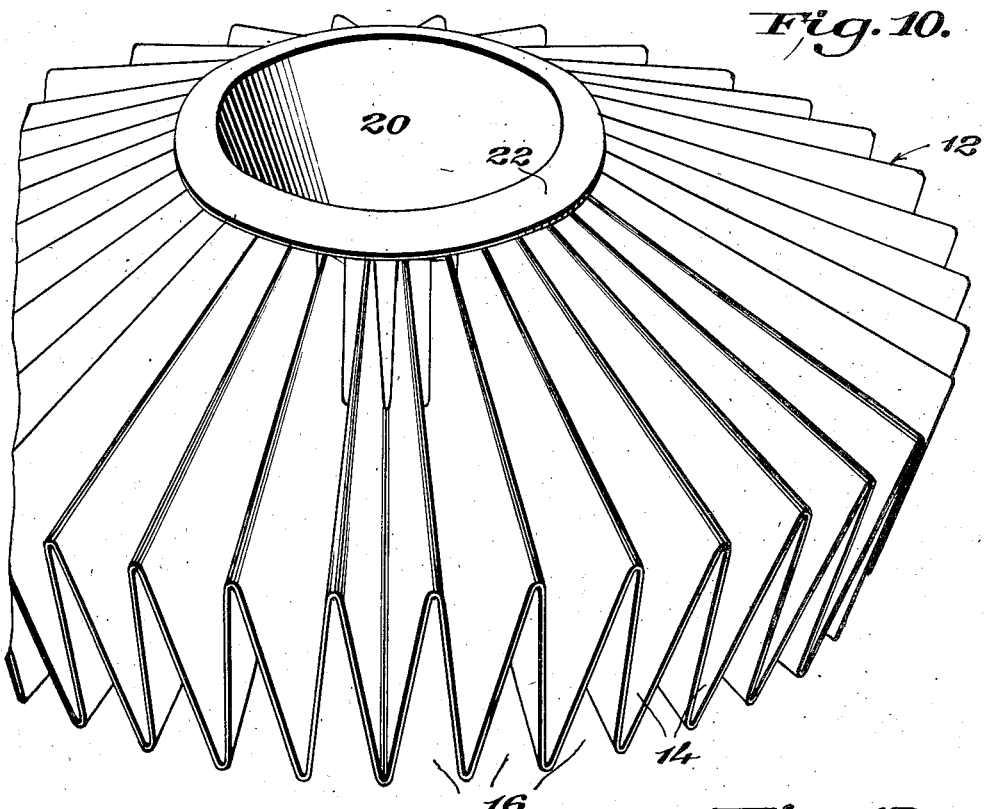
Fig. 10 is a perspective view of the air deflecting element of the device illustrated in Figs. 8 and 9.

Instead of the channels 14 being disposed parallel, or substantially parallel, to each other, they may radiate from a common point and may extend, collectively, throughout 360°, as illustrated in Figs. 6 and 7 of the drawings, whereby the supply air streams will be delivered laterally from the element 12 throughout 360°. Alternatively, said channels, if they radiate from a common point, obviously may extend, collectively, throughout an angle of less than 360°, whereby the supply air streams will be delivered laterally from said element 12 collectively in the form of a sector of any desired angular limits depending upon the collective angular extent of said channels.

If the channels 14 extend radially from a common point, the element 12 may be of any desired shape in plan, However, if said channels extend, collectively, throughout 360°, the element 12 preferably will be of circular shape in plan, while if said channels extend, collectively, throughout an angle of less than 360°, said element 12 preferably will be of sector-shape in plan.

In any instance where the channels 14 radiate from a common point, said channels preferably are closed at their inner ends and are open only at their outer ends, whereby the supply air streams flow only laterally outward from the element 12.

Regardless of whether the channels 14 radiate from a common point, or are disposed parallel, or substantially parallel, to each other, they may be inclined forwardly and outwardly relative to the direction of flow of the supply air against the element 12, whereby the supply air streams desirably are directed somewhat forwardly as well as laterally outward from said element 12. This, however, is not essential, since the channels 14 may extend perpendicularly to the direction of flow of the supply air against the element 12 with the result that the supply air streams will flow directly laterally from said element 12.

While it is not essential that the element 12 be provided with any channels other than the rearwardly opening channels 14, said element preferably is also provided, between the channels 14, with forwardly opening channels 16 which are open at their outer ends to provide for free flow of enclosure air laterally outward from the area in front of the element 12 directly into the spaces between the supply air streams. Obviously, by providing the element 12 with the forwardly opening channels 16, a considerably greater proportionate amount of enclosure air becomes entrained by and mixed with any given volume of supply air than would be the case in the absence of said channels 16.

The element 12 may be formed from any suitable material in any desired manner. However, from a practical and economical production standpoint, said element preferably is formed from sheet metal or other suitable sheet material pleated to provide the channels 14 and 16. Moreover, depending upon the size and shape of said element 12, the same may be of either one piece or plural section construction.

Figs. 8 to 11 of the drawings illustrate a practical commercial form of an air outlet device embodying the features of the invention. In said device the element 12 is of circular shape in end elevation and is disposed within an open-ended, hollow, forwardly flaring member 18 through which supply air is delivered forwardly into an enclosure. The element 12 is disposed transversely relative to the longitudinal axis of the member 18 and is of a diameter at least as great as the diameter of the smaller or rear end of said member 18, and has its rear marginal portion disposed closely adjacent to said member 18, so that it intercepts and deflects laterally outward all supply air flowing through said member 18. Moreover, said element 12 is provided not only with laterally spaced apart radially extending, rearwardly opening channels 14 which are open at their outer ends, whereby the supply air is divided into laterally spaced apart, radially outward flowing streams, but also is provided, between the channels 14, with radially extending channels 16 which open forwardly and are open at their outer ends to provide for free flow therethrough of enclosure air from the area in front of the element 12 laterally outward directly into the spaces between the supply air streams to replace the enclosure air entrained by said supply air streams.

Figure 12:
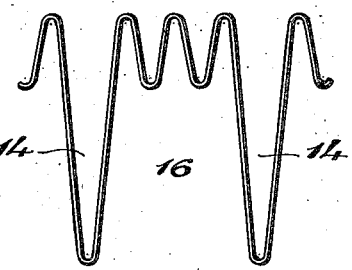
Fig. 12 is a fragmentary view illustrating an alternative embodiment of the air deflecting element of the device.

Since any given air outlet device is designed to have delivered therethrough a certain volume of air within a given period of time in order properly to heat, cool or ventilate a particular enlosure space served by the device, it follows that in any air outlet device constructed in accordance with the invention, the widths and depths of the channels 14 are such as to permit the required amount of supply air to flow through said channels to satisfy the requirements of the device. Similarly, the widths and depths of the channels 16 are such as to permith the required amount of enclosure air to flow from the area in front of the element 12 into the spaces between the supply air streams to provide for mixing of a desired proportionate amount of enclosure air with any given amount of supply air. In this connection it will be apparent that by varying the cross sectional areas of the channels 14 and 16, the proportionate amount of enclosure air that will be entrained by and mixed with any given amount of supply air may be varied within a considerable range. For example, as illustrated in Figs. 1 to 10 of the drawings, the cross sectional areas of the channels 14 are approximately equal to the cross sectional areas of the channels 16 and as a consequence any given amount of supply air delivered through the channels 14 will entrain and effect mixing therewith of a certain proportionate amount of enclosure air. On the other hand, as illustrated in Fig. 12 of the drawings, the channels 16 are of greater cross sectional areas than the channels 14, thus providing for entrainment and mixing of a greater proportionate amount of enclosure air with any given amount of supply air than in the example first stated.

Obviously, in varying the cross sectional areas of the channels 14 and 16, the cross sectional sizes and shapes of said channels may be varied in many different ways.

According to the Figs. 8 to 11 embodiment of the invention, the element 12 is formed from a strip of sheet material which first is pleated transversely to provide the channels 14 and 16 and which then is bent edgewise into circular form while inclined relative to the axis about which it is bent. Said strip thus is developed into the element 12 having the circular, forwardly flaring form illustrated wherein the pleats are opened like a fan and the channels 14 and 16 progressively increase in widths outwardly.

In bending the aforesaid pleated strip into circular form there is formed in the element 12 a central opening which, if not closed, would permit supply air to flow directly forwardly through the center of said element. Accordingly, said central opening is closed by a core member 20 of forwardly tapering, frustro-conical form which may either be inserted into said element 12 after the same has been formed or about which the pleated strip may be bent to form said element 12.

At the rear or larger end of the core member 20 is an outwardly extending flange 22 which overlaps the inner, rear, marginal portion of the element 12, while suitably fastened to the smaller or front end of said core member, as by means of a bolt 24, is a disk 26 the marginal portion of which overlaps the inner, front, marginal portion of the element 12. The inner portion of the element 12 thus is confined between the flange 22 and the marginal portion of the disk 26 and thereby the forwardly flaring frustro-conical form of said element 12 is rigidly maintained.

Assisting in maintaining the forwardly flaring, frustro-conical form of the element 12 is a ring 28 which is disposed against the outer, rear, marginal portion of said element and which has a forwardly directed marginal flange 30 which overlaps the rear portion of the outer edge of said element.

Figure 11:
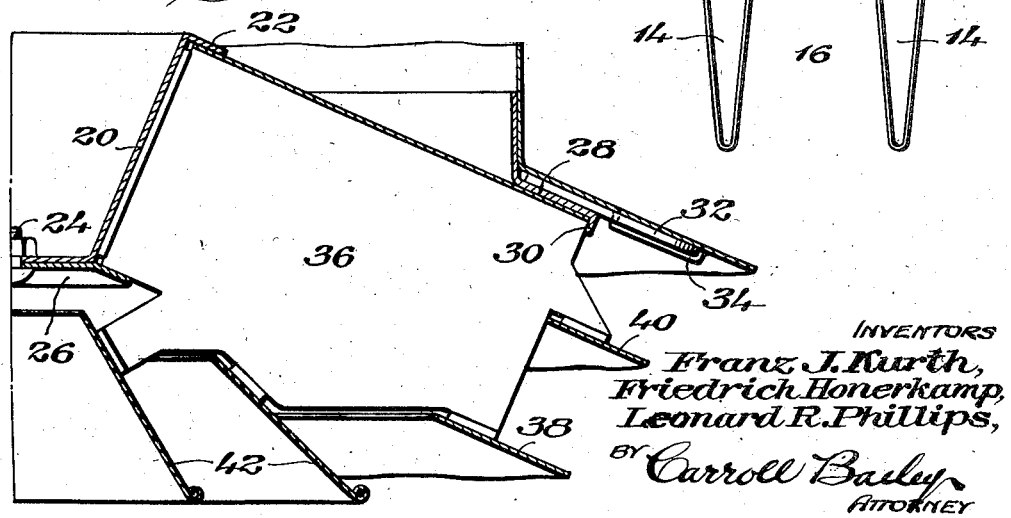
Fig. 11 is a section on the line 11—11 of Fig. 8.

The ring 28 may be welded or otherwise suitably fastened directly to the element 12 and either said ring or the element 12 may have welded or otherwise fastened thereto tongues 32 to be engaged, by rotation of the element 12 relative to the member 18, in sockets 34 formed in the member 18, to removably mount said element 12 in said member 18. Alternatively and as shown in Fig. 11, the ring 28 may be suitably fastened to a plurality of radially extending strut plates 36 which may be disposed in certain of the channels 16 and which may be welded or otherwise suitably fastened at their inner ends to the core member 20 and which may have the tongues 32 welded or otherwise suitably fastened to their outer end portions. In either case the structure is essentially the same, but for practical manufacturing reasons and to increase the rigidity of the structure, use of the strut plates 36 is preferred.

To assist in deflecting the supply air laterally outwardly, as well as to promote diffusion of the supply air and mixing of enclosure air therewith, there may be provided, to extend outwardly from the element 12 at the front end thereof, a forwardly flaring member 38. In addition and for the same purposes, another flaring member or members 40 may be provided to extend outwardly from the element 12 at one or more points between the front and the rear ends of said element. Obviously, the flaring members 38 and 40 may be fastened directly to the element 12 or to the strut plates 36 if the latter are used. Other open-ended, hollow, forwardly flaring members 42 may, if desired, be suitably mounted in front of the element 12 to insure flow of enclosure air into the channels 16 from a relatively extensive area in front of said element 12.

Obviously, by dividing the supply air into a number of separate, laterally spaced apart streams, any given amount of supply air will quickly entrain and effect mixing therewith of an exceptionally large proportionate amount of enclosure air to compensate rapidly for any temperature differential between the supply air and the enclosure air.

From the foregoing description considered in connection with the accompanying drawings, it is believed that the features of the invention and their advantages will be clearly understood. It is desired to point out, however, that while only certain specific embodiments of the invention have been illustrated and described, the same is readily capable of various other specifically different embodiments within its spirit and scope as defined in the appended claims.

We claim:

1. An element to be disposed transversely across the path of flow of supply air delivered into an enclosure to intercept the supply air and to deflect it laterally outwardly, said element having, with reference to the direction of flow of the supply air, rearwardly opening forwardly closed radially extending channels which are open at their outer ends whereby supply air delivered against said element is divided into separate laterally spaced apart radially outward flowing streams, said element having therein a central opening, a core member disposed in and closing said opening against flow of air therethrough, and means providing flanges at the front and the rear ends of said core member firm with respect to the latter and extending outwardly therefrom over and in constant firm engagement with the adjacent front and rear end portions, respectively, of said element to maintain said element and said core member firmly in assembly with each other.

2. The structure as set forth in claim 1 in which the core member is of frustro-conical form and tapers forwardly and in which the channeled element is of forwardly flaring form.

3. An element to be disposed transversely across the path of flow of supply air delivered into an enclosure to intercept the supply air and to deflect it laterally outwardly, said element having, with reference to the direction of flow of the supply air, rearwardly opening forwardly closed radially extending channels which are open at their outer ends whereby supply air delivered against said element is divided into separate laterally spaced apart radially outward flowing streams, said element having therein a central opening, a core member disposed in and closing said opening against flow of air therethrough, a flange at one end of said core member extending outwardly therefrom over one end portion of said element, and a disk fastened to said core member at its other end and extending outwardly therefrom over the other end portion of said element to maintain said element and said core member in assembly with each other.

4. An element to be disposed transversely across the path of flow of supply air delivered into an enclosure to intercept the supply air and to deflect it laterally outwardly, said element having, with reference to the direction of flow of the supply air, rearwardly opening forwardly closed radially extending channels which are open at their outer ends whereby supply air delivered against said element is divided into separate laterally spaced apart radially outward flowing streams, said element further having radially extending forwardly opening rearwardly closed channels which are open at their outer ends and which are located intermediate said first mentioned channels, respectively, for flow of enclosure air therethrough into the spaces between the streams of the supply air, strut members disposed in certain of said forwardly opening channels and fastened to said element, and air deflecting elements carried by said strut members to assist in directing the air streams laterally outward.

References Cited in the file of this patent

UNITED STATES PATENTS

| | | |
|---|---|---|
| 915,178 | Hillyard | Mar. 16, 1909 |
| 1,913,980 | Fisher | June 13, 1933 |
| 2,301,045 | Heath | Nov. 3, 1942 |
| 2,400,617 | Wheller | May 21, 1946 |
| 2,525,157 | Trane | Oct. 10, 1950 |
| 2,552,236 | Trane et al. | May 8, 1951 |
| 2,603,141 | Phillips et al. | July 15, 1952 |
| 2,656,782 | Labus | Oct. 27, 1953 |

FOREIGN PATENTS

| | | |
|---|---|---|
| 726,483 | Germany | Oct. 14, 1942 |